United States Patent [19]

Wanngård

[11] Patent Number: 5,063,041

[45] Date of Patent: Nov. 5, 1991

[54] PROCESS FOR THE REDUCTION OF PERCHLORATE IN ELECTROLYTES USED FOR THE PRODUCTION OF CHLORATE

[75] Inventor: Carl J. F. Wanngård, Sundsvall, Sweden

[73] Assignee: Eka Nobel AB, Surte, Sweden

[21] Appl. No.: 457,589

[22] Filed: Dec. 27, 1989

[30] Foreign Application Priority Data

Dec. 28, 1988 [SE] Sweden ................ 8804675

[51] Int. Cl.$^5$ ............... C01B 11/18; C01B 11/14; C25B 1/28; C25B 1/24
[52] U.S. Cl. ................... 423/476; 204/82; 204/95; 423/475
[58] Field of Search ............ 423/476, 475; 204/82, 204/95

[56] References Cited

U.S. PATENT DOCUMENTS

| | | | |
|---|---|---|---|
| 1,965,457 | 7/1934 | Ehrhardt | 423/476 |
| 2,813,825 | 11/1957 | Miller | 204/95 |
| 2,853,362 | 9/1958 | Jaszka et al. | 423/476 |
| 3,020,124 | 2/1962 | Bravo et al. | 423/476 |

FOREIGN PATENT DOCUMENTS

2432416 7/1973 Fed. Rep. of Germany ........ 204/95

OTHER PUBLICATIONS

Mellor, J. W., "A Comprehensive Treatise on Inorganic and Theoretical Chemistry" Longmans, Green, 1946; vol. 2, pp. 298–299.

J. Schumacher, "Perchlorates, Their Properties Manufacture and Uses ACS Monograph Series" No. 146, Reinhold; 1960, p. 30.

R. Kirk and D. Othmer, "Encyclopedia of Chemical Technology", 1st Ed., vol. 3, Interscience Encyclopedia, 1949, pp. 727–728.

Linke and Seidell, "Solubilities, Inorganic and Metal-Organic Compounds", 1965; pp. 1018 and 1019.

*Primary Examiner*—Michael Lewis
*Assistant Examiner*—Brian M. Bolam
*Attorney, Agent, or Firm*—Burns, Doane, Swecker & Mathis

[57] ABSTRACT

The invention relates to a process for the reduction of the perchlorate content in electrolytes for chlorate production, whereby the electrolyte is subjected to the following process steps:

a) a part of the flow of an electrolyte leaving the chlorate process is evaporated at an elevated temperature of from 30° to 110° C. and/or at a reduced pressure to a reduction in liquid volume of from 1 to 4 times, b) the product from the previous step is cooled to a temperature of from 30° to 0° C., c) to the product from the previous step is added a potassium chloride solution with a concentration of at least 1.0 mole/l up to the saturation concentration, d) the product from the previous step is relieved of solid phase and recirculated to the chlorate process.

16 Claims, 2 Drawing Sheets

PROCESS FOR THE REDUCTION OF PERCHLORATE IN ELECTROLYTES USED FOR THE PRODUCTION OF CHLORATE

The invention relates to a process for the reduction of perchlorate in electrolytes for the production of chlorate, whereby the electrolyte is evaporated prior to the precipitation of perchlorate to raise the concentration of perchlorate and thus increase its availability.

Alkali metal chlorate, and particularly sodium chlorate, is an important chemical in the cellulose industry, where it is used as a raw material for the production of chlorine dioxide, which is an important bleaching chemical for cellulose fibers. Sodium chlorate is produced by electrolysis of sodium chloride. The process is cyclic, where in a first step an aqueous solution of sodium chloride is brought to the electrolyser for reaction at the electrodes, followed by a transfer of the electrolyte to reactor vessels for further reaction. A minor part of the flow is transferred to the crystallizer for precipitation of sodium chlorate, while the major part of the flow is recycled to the electrolyser along with the mother liquor leaving the crystallizer and make-up of fresh sodium chloride solution.

A problem in chlorate processes is the formation of an undesirable amount of perchlorate which is continuously enriched in the cyclic process. The formation of perchlorate is associated with a poor function of the anodes and can be overcome partly through a careful control of the process conditions and of the selectivity of the anodes. It is possible that up to 0.5 g sodium perchlorate per kg sodium chlorate is formed, despite such control. This is equivalent to an increase in the concentration per year in the order of 5 to 10 g sodium perchlorate/l in a chlorate plant with normal power density.

The main problem with perchlorate accumulation is that the solubility of sodium chloride is reduced, which makes it more difficult to dissolve sodium chloride in the electrolyte, and which makes flash evaporation of water and flash crystallization more difficult.

The accumulation of perchlorate is difficult to avoid due to its high solubility, 1,100 g sodium perchlorate/l in water at ambient temperature, see J. Schumacher, 'Perchlorates, Their properties, manufacture and uses', ACS Monograph Series No 146, Reinhold, 1960, page 30. Experiments to reduce the concentration of perchlorate through precipitation and separation of potassium perchlorate, in accordance with the method described in R. Kirk and D. Othmer, 'Encyclopedia of Chemical Technology', 1st edition, volume 3, Interscience Encyclopedia, 1949, page 727 to 728, for the preparation of potassium perchlorate from sodium perchlorate, have shown that it is difficult to get below 40 g sodium perchlorate/l despite the relatively low solubility of potassium perchlorate, just below 20 g/l in water at ambient temperature. At concentrations lower than 40 g sodium perchlorate/l it has been found that added potassium reacts with the chlorate, yielding a precipitate of potassium chlorate instead. Furthermore, direct precipitation of potassium perchlorate with potassium chloride solution in chlorate electrolyte, yields a very impure perchlorate with a purity that rarely exceeds 50%.

Through the process of the present invention it is possible to reduce the concentration of perchlorate in a chlorate process to much lower levels than 40 g/l. This can be achieved by precipitation with potassium chloride if the electrolyte before the precipitation is evaporated to raise the concentration of perchlorate and thereby increase its availability.

Thus, the invention concerns a process as disclosed in the claims. According to the invention, a part of the electrolyte flow from a chlorate process is, in a first step, evaporated at an elevated temperature of from 30 to 110° C. and/or at a reduced pressure to decrease the liquid volume by 1 to 4 times. The concentration of perchlorate is thereby raised above 40 g/l. Formed precipitate is then optionally separated off.

In a second step the solution or slurry from the first step is, according to the invention, cooled to a temperature between 30° C. and 0° C. Formed precipitate is then optionally separated off.

In a third step a volume of potassium chloride solution is, according to the invention, added to the solution or slurry from the previous step. The potassium chloride solution has a temperature of from 0 to 50° C. and a concentration of at least 1.0 mole/l up to saturated solution. The added volume shall contain from 20 to 120% of the amount of potassium that is part of the maximum amount of potassium perchlorate that can be selectively precipitated. The precipitate formed is then separated off and the remaining solution is recirculated to the chlorate process. The concentration of sodium perchloride is thereby reduced to below 40 g/l.

DETAILED DESCRIPTION OF THE PREFERRED EMBODIMENTS

Figure 1:
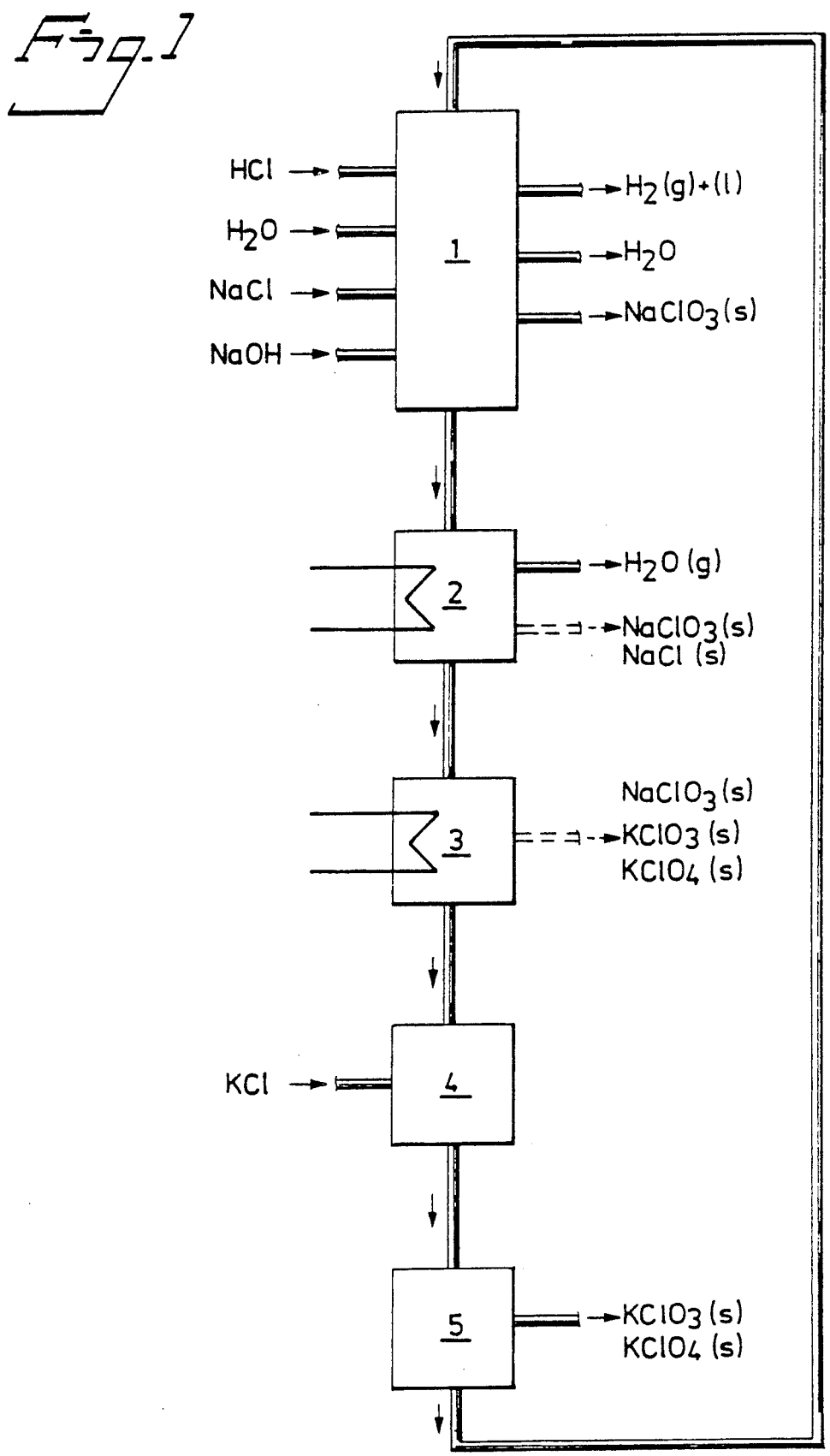
FIG. 1 is a flow chart of the process according to the invention.

The process according to the invention is illustrated by the flow chart in FIG. 1, where box 1 illustrates a chlorate production plant. In the first process step according to the invention, box 2, a part of the chlorate electrolyte flow is evaporated at a temperature within the range from 30 to 110° C., preferably at a temperature of from 30 to 60° C., so that the liquid volume is reduced by from 1 to 4 times, preferably by from 2 to 3 times. The part of the flow can constitute the entire or part of, preferably from 5 to 100%, usually from 10 to 90%, of the flow from the sodium chlorate crystallizer. It can also be part of the flow from the reactor vessels or the entire or part of the flow in the filtration system of the chlorate plant. This process step normally includes precipitation of sodium chloride and sodium chlorate, sometimes together with potassium chlorate and potassium perchlorate, optionally followed by separation of the solid phase.

In the second process step, box 3, the mother liquor or slurry from the previous step is cooled to from 30 to 0° C., preferably to from 20 to 0° C. This can result in additional precipitation of sodium chlorate, potassium chlorate and potassium perchlorate, and the solid phase is then optionally separated off.

The third process step, box 4, comprises addition of a suitable volume of potassium chloride solution, of arbitrary temperature and a concentration between 1.0 mole/l and saturated solution, to the remaining part of the mother liquor or slurry. This gives a precipitate of potassium perchlorate and possibly also of potassium chlorate. The potassium chloride solution is added slowly and batch wise to make the crystal growth efficient, i.e. during a time of at least 15 minutes with a final temperature of from 0 to 30° C. and with a minimum dwell time of 15 minutes to allow for crystal growth and to arrive at the final equilibrium composition. The amount of potassium chloride shall be between 20 and 120% of the maximum amount of the potassium perchlorate that can be selectively precipitated, i.e. from 0.12 to 0.73 kg potassium chloride per kg entering sodium perchlorate. The added amount of potassium chloride is preferably between 50 and 100% of the maximum amount of the potassium perchlorate that can be selectively precipitated. The added amount of potassium chloride depends, as is discussed below, among other things on the potassium content of the chlorate electrolyte and on the intended use of the precipitation product.

In the subsequent separation step, see FIG. 1, box 5, precipitated potassium perchlorate and potassium chlorate from the precipitation step is separated off, and the remaining mother liquor is then recirculated to the chlorate production plant. The concentration of the electrolyte in the process of the sodium chlorate production plant is thereby maintained below about 40 g/l.

The precipitation product obtained in the third step contains the amount of potassium properly separated from the chlorate electrolyte, which can be worked-up to a marketable product or alternatively be deposited or disposed of in another way. The solid precipitation products, that are separated off from the above described steps 1 and 2, can either be recirculated, i.e. again be dissolved in the chlorate electrolyte, or disposed of by working-up to a marketable product, deposition or the like.

The residence time in the evaporation step, cooling step and precipitation step respectively, should be sufficient to allow for equilibrium establishment in leaving mixtures of solid phase/liquid phase from every process step.

Figure 2:
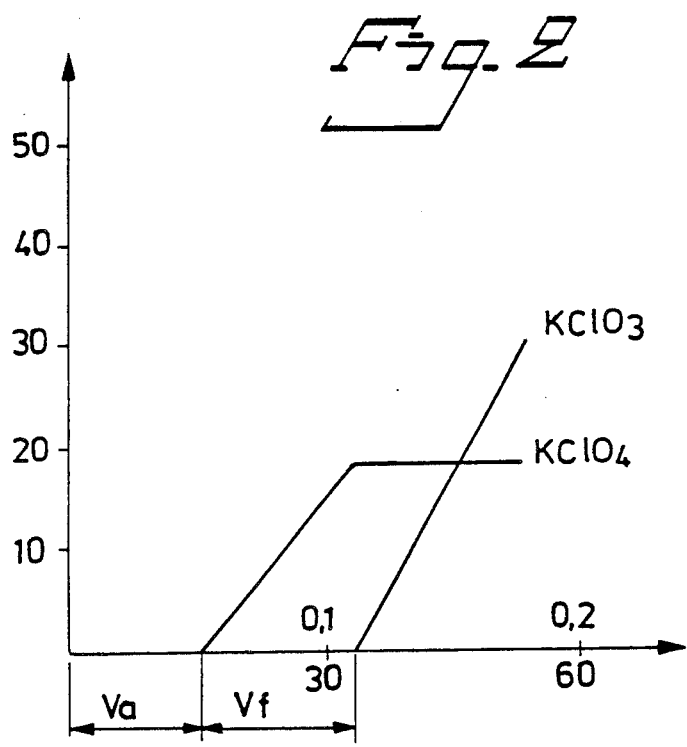
FIG. 2 is a graphical representation of the precipitation of potassium chlorate and potassium perchlorate from a perchlorate containing chlorate electrolyte.

FIG. 2 shows precipitation of potassium chlorate and potassium perchlorate from a perchlorate containing chlorate electrolyte containing 60 g sodium perchlorate/l and approximately 120 g sodium chloride/l and 500 g sodium chlorate/l. The upper denotation on the X-axis refers to $m^3$ potassium chloride solution per $m^3$ electrolyte, while the lower denotation refers to kg potassium chloride per $m^3$ electrolyte. The Y-axis shows kg solid phase per $m^3$ electrolyte. The temperature is 25° C. and the content of potassium chloride is 300 g/l solution (saturated solution). FIG. 2 shows how potassium perchlorate starts to precipitate when the amount of added potassium chloride is sufficient for saturation (area Va). When additional potassium chloride is added the concentration of perchlorate decreases progressively in the solution. The solubility limit for potassium chlorate is approached at the same time (area Vf). It is evident from FIG. 2 that the precipitation of perchlorate is halted when potassium chlorate is precipitated. Since the aim is to precipitate potassium perchlorate with maximum selectivity, it is therefore suitable to stop the precipitation before this point is reached. In the example outlined above, the saturation limit is reached when Va has been exceeded with approximately 18 kg potassium chloride per $m^3$ electrolyte. This yields approximately 19 kg of solid potassium perchlorate per $m^3$ evaporated electrolyte. Therefore, part of the potassium added has not reacted but will be accumulated in the electrolyte system of the chlorate plant.

The perchlorate precipitate obtained also contains coprecipitated amounts of chlorate and chloride (approximately 10 to 15% counted as sodium chloride and sodium chlorate). The precipitate is filtered or centrifuged, which can give a moisture content of up to 10% (normally 2 to 5%) due to the remaining mother liquor. This also means that up to about 10% sodium chlorate and 4% sodium chloride will be included. It must be stressed that the properties of the precipitate, e.g. particle size, aggregate formation etc., and also the performance of the separating equipment is of great importance, as well as the residence times in the preceding process steps.

The potassium content in area Va in FIG. 2 and part of the potassium content in area Vf will thus be accumulated in the electrolyte system of the chlorate plant in a long range perspective. The required amount of potassium chloride to reach the saturation composition for potassium perchlorate in the precipitation step, equivalent to area Va in FIG. 2, decreases as the potassium concentration in the chlorate electrolyte increases.

Figure 3:
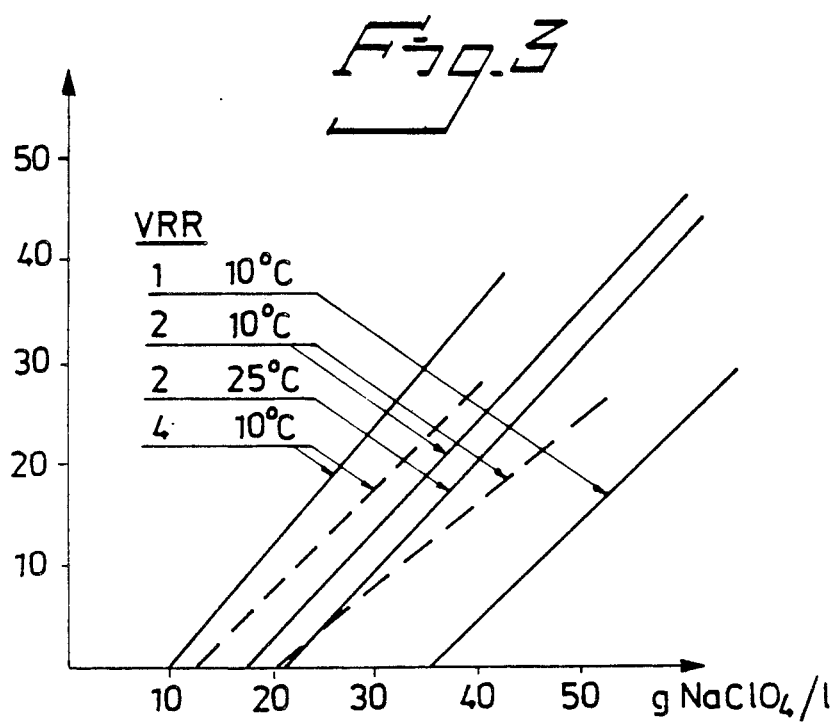
FIG. 3 is a graphical representation of the maximum amount of potassium perchlorate that can be selectively precipitated as a function of the sodium perchlorate concentration in the electrolyte.

FIG. 3 shows the maximum amount of potassium perchlorate that can be selectively precipitated per $m^3$ original chlorate electrolyte as a function of the sodium perchlorate concentration in the electrolyte as well as various volume reductions during evaporation (volume reduction ratio VRR=4, 2 and 1 respectively). Thus, the X-axis shows g sodium perchlorate per liter and the Y-axis shows kg solid phase per $m^3$ electrolyte. The continuous lines in the graph are valid for initially potassium free solution while the dotted lines refers to complete potassium recirculation, i.e. the situation where all potassium leaving the precipitation step and being brought back to the chlorate process, after a long period of operation is separated off to the perchlorate elimination system again. All operation cases will be within these extreme boundaries.

The evaporation temperature during the runs shown in FIG. 3 is 50° C. The temperature in the cooling step is normally 10° C. The lower the temperature in the cooling step the more chlorate is crystallized here. The precipitation of potassium chlorate in the precipitation step is hereby reduced and the maximum amount of potassium perchlorate that can be selectively precipitated is slightly increased. This temperature effect is shown in FIG. 3 at 10° C. and 25° C. respectively, and with a volume reduction ratio of 2.

The suitable amount of potassium chloride can be calculated from FIG. 3, as a function of evaporation degree and the content of potassium and perchlorate in entering electrolyte flow. To sum up, the realization of the process is defined by the following parameters:
1) Rate of formation of perchlorate
2) Desired concentration of perchlorate in the chlorate process, particularly in the part of the flow which is brought to the system for perchlorate reduction
3) Temperature and composition of the selected electrolyte flow, i.e. mainly the concentration of chlorate, chloride, perchlorate and sulfate respectively, and to a minor extent the concentration of hypochlorite, dichromate, carbonate etc.
4) Volume reduction, temperature and residence time in the evaporation step and the optional presence of solid phase separation after this.

5) Final temperature and residence time in the following cooling step and the optional presence of solid phase separation after this.
6) Content and volume of added potassium chloride solution, and temperature, precipitation rate, residence time and agitation in the precipitation step The necessary apparatus configuration, energy demand and potassium chloride content is obtained by choice of these parameters. Complete information of the size and composition of the electrolyte flows, especially the required size of the part of the flow, that is necessary to treat per unit of time, is also obtained by this choice.

EXAMPLE a) Process Without Evaporation

The easiest way to precipitate perchlorate from a chlorate electrolyte is to add potassium chloride solution directly to the electrolyte. After a residence time of a couple of hours, preferably under mild agitation, the precipitation product can be separated from the mother liquor, e.g. by filtration.

These precipitation conditions were studied experimentally, by adding varying amounts of potassium chloride to a number of solutions containing 500 g sodium chlorate/l and 100 g sodium chloride/l. The solutions were left to stand for several days at 20° C. with regular agitation. It was found that potassium chlorate started to precipitate when the potassium concentration exceeded 0.22 mole $K^+/l$.

When a corresponding experiment was conducted with solutions containing 500 g sodium chlorate/l, 15.6 g potassium chloride/l, 100 g sodium chloride/l and varying amounts of sodium perchlorate, potassium perchlorate started to precipitate when the concentration exceeded 37.3 g sodium perchlorate/l.

Therefore, in a chlorate electrolyte at 20° C, that normally contains 550 g sodium chlorate/l, potassium chlorate starts to precipitate when the potassium content equals 0.20 mole $K^+/l$. Consequently, the perchlorate content cannot be below 38.6 g sodium perchlorate/l, if this potassium concentration must not be exceeded.

A more efficient process must be used to reach lower perchlorate concentrations. This is shown below for a chlorate plant with a production of 0.5 kg sodium perchlorate/hour. The example shows how the perchlorate concentration is kept at 30 g sodium perchlorate/l in a part of the flow that is saturated with chlorate at 25° C. and the size of the part of the flow that has to be treated.

b) Process According to the Invention

An electrolyte that is saturated with chlorate at 25° C., containing 30 g sodium perchlorate/l and 150 g sodium chloride/l is evaporated to half the volume at 50° C. Under these conditions, 103 kg sodium chloride and 143 kg sodium chlorate were precipitated per m³ initial electrolyte, and were separated off by filtration or centrifugation. This precipitate was returned to the chlorate plant and dissolved in its electrolyte system. Approximately 400 kg of water were evaporated per m³ solution entering.

The remaining mother liquor was cooled to 10° C., and hereby additionally 108 kg sodium chlorate per m³ initial electrolyte were precipitated, filtered or centrifuged, washed and mixed with the product from the sodium chlorate plant.

This perchlorate enriched chlorate electrolyte from the cooling step was treated with potassium chloride solution. When the saturation composition of the solution had been reached, potassium perchlorate precipitated. A selective precipitation of potassium perchlorate was obtained in this case at a potassium chloride content of up to 18 kg per m³ solution. Approximately 20 kg potassium perchlorate per m³ were precipitated, which is equal to a 33% reduction of perchlorate and 7.2 kg perchlorate per m³ received flow from the chlorate plant. The amount of unreacted potassium chloride was approximately 7 kg per m³ solution. The obtained precipitate was filtered off and worked-up to a marketable quality in a separate purification plant.

If 0.5 kg sodium perchlorate/hour has been produced, i.e. 0.41 kg perchlorate/hour in a perchlorate plant with a perchlorate concentration equal to 30 g sodium perchlorate/l in the mother liquor leaving the chlorate crystallizer, the necessary volume to treat is 0.41/7.2, i.e. 0.056 m³ solution per hour from the chlorate plant.

In chlorate processes, precipitation with potassium chloride can be used to reduce the perchlorate concentration down to about 40 g sodium perchlorate/l. A lowering of the precipitation temperature, only makes it possible to further reduce the sodium perchlorate concentration to a small extent.

However, a substantially greater reduction in concentration can be achieved according to the invention if the electrolyte is evaporated and cooled prior to the precipitation. A reduction in electrolyte volume to 50% can thus reduce the perchlorate concentration to about 20 g/l. Hereby, about 80 kg/m³ sodium chloride and 200 kg/m³ sodium chlorate and also about 100 kg/m³ sodium chlorate are additionally obtained in the cooling step. The stated volume reduction requires evaporation of 400 kg $H_2O$/m³. The concentration of sodium perchlorate can be reduced further down to 10 g/l if the volume is reduced to 25% in the evaporation. Thus, if it is desireable to keep the perchlorate concentration at e.g. 30 g sodium perchlorate/l a part of the flow of the electrolyte can be treated in this way.

The crystallization and salt dissolving problems which the higher perchlorate concentration brings about in a continuously working chlorate producing plant, are substantially reduced with a perchlorate concentration lowered in this way.

I claim:

1. In a process for the production of sodium chlorate and byproduct sodium perchlorate which includes the steps of electrolyzing an aqueous electrolytic solution of sodium chloride in an electrolyzer, transferring the electrolytic solution to one or more reaction vessels for further reaction, recovering sodium chlorate from the electrolytic solution in the electrolyzer, and recycling at least a portion of the electrolytic solution to the electrolyzer, the improvement comprising:
   (a) diverting at least a portion of the electrolytic solution from the process and evaporating water from the diverted portion to thereby reduce its liquid volume and form a precipitate, the precipitate optionally being separated from the liquid, the evaporation increasing the concentration of sodium perchlorate in the diverted portion;
   (b) cooling the diverted portion of solution from step (a) to a temperature of between about 30° C. and about 0° C., a precipitate thereby being formed and optionally being separated from the cooled solution, the concentration of sodium perchlorate in the cooled solution being at least about 40 g/l;

(c) adding potassium chloride solution to the cooled solution from step (b), and converting soluble sodium perchlorate in the cooled solution to insoluble potassium perchlorate via metathesis with the added potassium chloride, the potassium perchlorate thereby precipitating, the potassium chloride solution having a concentration of from about 1.0 mole/l up to the saturation concentration and being at a temperature of between about 0° and about 50° C., the volume of the added potassium chloride solution containing from about 20% to about 120% of the potassium needed for precipitating the maximum amount of potassium perchlorate that can be selectively precipitated; and (d) separating the solution from step (c) from the potassium perchlorate precipitate, and recycling the separated solution to the non-diverted portion of the electrolytic solution;

wherein said step of recovery of sodium chlorate occurs separately from the recovery of potassium perchlorate in step (d); and wherein the concentration of sodium perchlorate in the electrolytic solution of the sodium chlorate process is less than about 40 g/l.

2. A process according to claim 1, wherein the sodium chlorate process is cyclic, and the concentration of sodium perchlorate in the electrolytic solution is less than about 40 g/l.

3. A process according to claim 1, wherein the liquid volume of the diverted portion is reduced in step (a) to result in a volume reduction ratio (VRR) defined as the ratio of initial volume to final volume after evaporation, of up to 4.

4. A process according to claim 3, wherein the evaporation in step (a) results in a volume reduction ratio of from 2 to 3.

5. A process according to claim 3, wherein the evaporation in step (a) takes place at a temperature of from about 30° to about 60° C.

6. A process according to claim 5, wherein the evaporation in step (a) results in a volume reduction ratio of from 2 to 3.

7. A process according to claim 1, wherein the diverted portion from step (a) is cooled in step (b) to a temperature of from about 20° to about 0° C.

8. A process according to claim 3, wherein the diverted portion from step (a) is cooled in step (b) to a temperature of from about 20° to about 0° C.

9. A process according to claim 4, wherein the diverted portion from step (a) is cooled in step (b) to a temperature of from about 20° to about 0° C.

10. A process according to claim 5, wherein the diverted portion from step (a) is cooled in step (b) to a temperature of from about 20° to about 0° C.

11. A process according to claim 6, wherein the diverted portion from step (a) is cooled in step (b) to a temperature of from about 20° to about 0° C.

12. A process according to claim 1, wherein the volume of potassium chloride added in step (c) is sufficient for precipitating from 50% to 100% of the maximum amount of potassium perchlorate that can be selectively precipitated.

13. A process according to claim 1, wherein the residence times of the solution in steps (a), (b) and (c) are sufficient for the respective solutions to reach equilibrium between the respective solid precipitate phase.

14. In a process for the production of sodium chlorate and byproduct sodium perchlorate which includes the steps of electrolyzing an aqueous electrolytic solution of sodium chloride in an electrolyzer, transferring the electrolytic solution to one or more reaction vessels for further reaction, and recovering sodium chlorate from the electrolytic solution in the electrolyzer, the improvement comprising:

(a) diverting at least a portion of the electrolytic solution from the process and evaporating water from the diverted portion to thereby reduce its liquid volume and increase the concentration of sodium perchlorate in the diverted portion;

(b) cooling the diverted portion of solution from step (a) to a temperature sufficient to effect precipitation and optionally separating the precipitate from the cooled solution, the concentration of sodium perchlorate in the cooled solution being at least about 40 g/l;

(c) adding potassium chloride solution to the cooled solution from step (b), the potassium chloride solution having a concentration sufficient to convert soluble sodium perchlorate in the cooled solution to insoluble potassium perchlorate via metathesis, the potassium perchlorate thereby precipitating;

(d) separating the solution from step (c) from the potassium perchlorate precipitate, and recycling the separated solution to the non-diverted portion of the electrolytic solution;

wherein said step of recovery of sodium chlorate occurs separately from the recovery of potassium perchlorate in step (d); and wherein the concentration of sodium perchlorate in the electrolytic solution of the sodium chlorate process is less than about 40 g/l.

15. A process according to claim 14, wherein the volume of potassium chloride added in step (c) is sufficient for precipitating from 50% to 100% of the maximum amount of potassium perchlorate that can be selectively precipitated.

16. A process according to claim 14, wherein the residence times of the solutions of steps (a), (b) and (c) are sufficient for the respective solutions to reach equilibrium with a respective solid precipitate phase.

* * * * *